(12) United States Patent
Shin

(10) Patent No.: US 6,465,127 B1
(45) Date of Patent: Oct. 15, 2002

(54) NEGATIVE ELECTRODE FOR SECONDARY BATTERY INCLUDING A METAL OXIDE

(75) Inventor: Jeong-Soon Shin, Chungchongnam-do (KR)

(73) Assignee: Samsung SDI Co., Ltd., Youngin (KR)

( * ) Notice: Subject to any disclaimer, the term of this patent is extended or adjusted under 35 U.S.C. 154(b) by 0 days.

(21) Appl. No.: 09/490,978

(22) Filed: Jan. 24, 2000

(30) Foreign Application Priority Data

Feb. 19, 1999 (KR) ................................. 99-5506

(51) Int. Cl.[7] .......................... H01M 4/36; H01M 4/50; H01M 4/62
(52) U.S. Cl. .................... 429/218.1; 429/231.8
(58) Field of Search ............................ 429/218.1, 231.8

(56) References Cited

U.S. PATENT DOCUMENTS

| | | | | |
|---|---|---|---|---|
| 3,880,672 A | * | 4/1975 | Megahed | 136/111 |
| 3,993,503 A | * | 11/1976 | Ludwig | 429/103 |
| 4,037,033 A | * | 7/1977 | Takamura | 429/206 |
| 4,446,212 A | * | 5/1984 | Kaun | 429/103 |
| 4,876,628 A | * | 10/1989 | Goldner | 361/313 |
| 5,705,291 A | * | 1/1998 | Amatucci | 429/137 |
| 5,824,434 A | * | 10/1998 | Kawakami | 429/209 |
| 5,863,676 A | * | 1/1999 | Charkey | 429/229 |
| 5,869,208 A | * | 2/1999 | Miyasaka | 429/224 |

FOREIGN PATENT DOCUMENTS

JP 09-199087 7/1997

* cited by examiner

*Primary Examiner*—Patrick Ryan
*Assistant Examiner*—Mark Ruthkosky
(74) *Attorney, Agent, or Firm*—Robert E. Bushnell, Esq.

(57) ABSTRACT

A negative electrode for a secondary battery includes a substrate deposited with an active material including carbon and a metal oxide selected from aluminum, barium, magnesium and zinc oxides. The metal oxide is coated on a surface of particles of the active material or the metal oxide and the active material are powdered, then mixed together, and deposited on the substrate.

17 Claims, 4 Drawing Sheets

NEGATIVE ELECTRODE FOR SECONDARY BATTERY INCLUDING A METAL OXIDE

BACKGROUND OF THE INVENTION

1. Field of the Invention

The present invention relates to a secondary battery and, snore particularly, to a negative electrode for a secondary battery that can enhance a uniform distribution of an electrolyte, thereby preventing the negative electrode from locally expanding.

2. Description of Related Arts

Lithium secondary batteries are rechargeable and compact in size. yet provide a large capacity. Well known as the lithium secondary battery is a lithium-ion battery.

In the lithium-ion secondary battery, a lithium metal oxide is used LIs a positive active material and a carbon-based material is used as a negative active material. In addition, a mixture solution where a lithium salt was dissolved within a mixture solvent of ethylene carbonate and dimethoxy carbonate is used as an electrolyte. The lithium salt is selected from the group consisting of 6-fluoro phosphorus boron lithium (LiPF6) and 4-fluoro boron lithium (LiBF4).

Therefore, the charging operation is realized while lithium ions released from the positive electrode are absorbed into the carbon-based material of the negative electrode, and the discharging operation is realized while the lithium ions absorbed into the carbon-based material of the negative electrode are absorbed into the lithium metal oxide.

The positive electrode is made by depositing a lithium metal oxide paste on a positive substrate, then drying and roll-pressing the same. The negative electrode is made by same processes as those of the positive electrode using carbon-based material paste. Here, each of the pastes is composed of an active material, a conductive material, and a binder. After the roll-pressing process is completed, the electrodes are cut to a desired length. A separator is disposed between the positive and negative electrodes, then rolled having a plurality of turns, thereby obtaining a rolled electrode assembly. The rolled electrode assembly is inserted into a can, then the electrolyte is injected into the can. Finally, a cap assembly is air-tightly mounted on the can.

FIG. 1A is a partially exploded perspective view illustrating a conventional lithium ion battery, as previously described. Referring to FIG. 1A, a lithium secondary battery 10 includes a can 15 and an electrode assembly 14 installed inside the can 15. Here, the electrode assembly 14 is constructed such that a separator 13 is disposed between a positive electrode 11 and a negative electrode 12. A cap 16 is mounted on the can 15.

In addition, it is well known that, when recharging, for example, a 4.1 V battery to 4.2 V, a capacity of the battery is increased by 10%. However, in this case, the negative electrode locally expands and contracts. This causes the life span of the battery to be shortened as the charging and discharging operations are repeated.

Describing more in detail, it is well known that a rolled electrode assembly is contained in an electrolyte within a can. Therefore, when the battery is over-charged by 10% by, for example, the 4.2 V charging operation, upper and lower portions of the rolled electrode assembly around which a relatively large amount of electrolyte is distributed continue their normal reaction without any problems. However, a middle portion of the rolled electrode assembly. around which a relatively small amount of the electrolyte is provided, does not sufficiently react.

The rolled electrode assembly reacts throughout its entire portion until the battery is charged to a predetermined amount. However, as the battery is charged to a full amount, the upper and lower portions of the rolled electrode assembly become over-charged. As a result, the negative electrode deposited with the carbon-based material, in which the lithium ions released from the positive electrode are absorbed, locally expands to an excessive level at its upper and lower portions. Furthermore, the discharging amount of the negative electrode becomes large during the discharging operation. For example, Ad hen the battery is charged to 4.1 V, the surface temperature of the battery is within a range of 41–42 ° C. at the end of the discharging operation, whereas when over-charged to 4.2 V, the surface temperature of the battery is within a range of 45–46 ° C.

The above-described local over-charging problems due to the non-uniform electrolyte distribution causes the porous structure of the separator made of polyethylene to become deformed. That is, when observing a SEM picture of the porous structure of the separator, it is noted that the portion of the separator contacting the negative electrode loses its porous structure. This is referred to as a "shut-down" of the separator and is caused by both the local expansion of the negative electrode and the heat generated during the discharging operation of the battery.

When the shut-down of the separator occurs, a portion of the rolled electrode assembly corresponding to a portion of the separator where the shutdown occurs cannot react. That is, this portion is left as a non-reaction area where no charging and discharging occurs. This non-reaction area is increased as the charging and discharging operations are repeated many times, reducing the durability of the battery.

SUMMARY OF THE INVENTION

For the forgoing reason, there is a need for a battery that can prevent a negative electrode from expanding and contracting when the battery is overcharged by 10 % by the 4.2 V charging operation and can retain 75 % of its capacity after 300-recharging cycles.

To achieve the above need, the present invention provides an electrode for a secondary battery comprising a substrate deposited with an active material and a metal oxide.

The metal oxide may be coated on a surface of particles of the active material of the negative electrode.

The metal oxide and the active material may be powdered, then mixed together, and deposited on the substrate.

Preferably, the metal oxide is selected from the group consisting of magnesium oxide (MgO), aluminum oxide ($Al_2O_3$), barium oxide (BaO), and zinc oxide (ZnO).

Preferably, amount of the metal oxide is 1–5 wt %. A particle size of the metal oxide is less than 5 $\mu$m.

BRIEF DESCRIPTION OF THE DRAWINGS

The accompanying drawings, which are incorporated in and constitute a part of the specification, illustrate embodiments of the invention, and, together with the description) serve to explain the principle of the invention.

DETAILED DESCRIPTION OF PREFERRED EMBODIMENTS

Preferred embodiments of the present invention will now be described in detail with reference to the accompanying drawings.

In the present invention, to prevent a negative electrode from locally expanding and contracting, a method for making an electrolyte distribution in the battery uniform is provided so that the negative electrode uniformly reacts throughout its entire area.

That is, a metal oxide layer that can effectively absorb the electrolyte is formed on the negative substrate. Alternatively a metal oxide powder is mixed with the negative active material, then deposited on the negative substrate.

Figure 1:
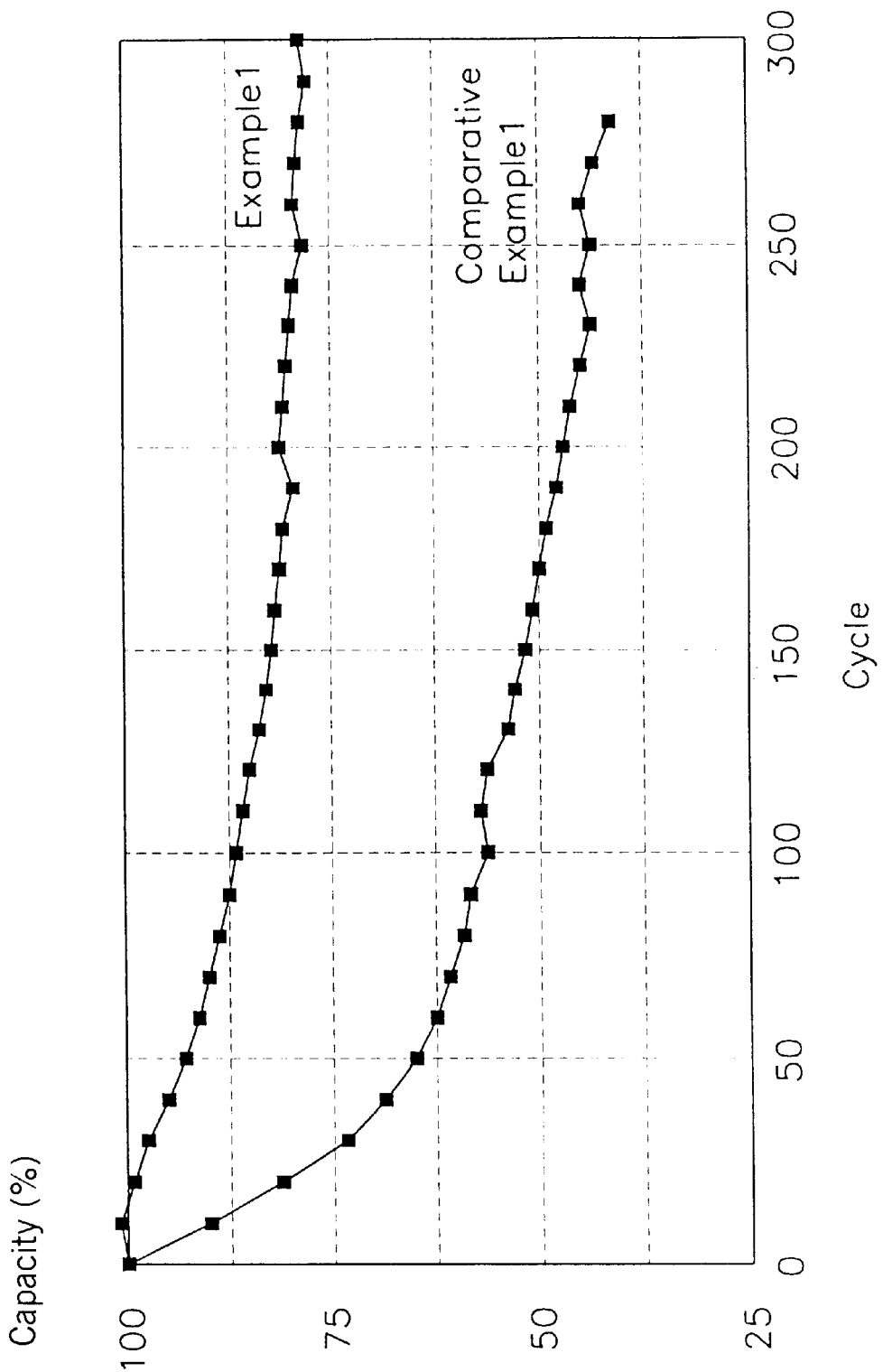
FIG. 1 is a graph illustrating a durability characteristic of a lithium-ion battery having an electrode deposited with a metal oxide layer according to the present invention.
Figure 1A:
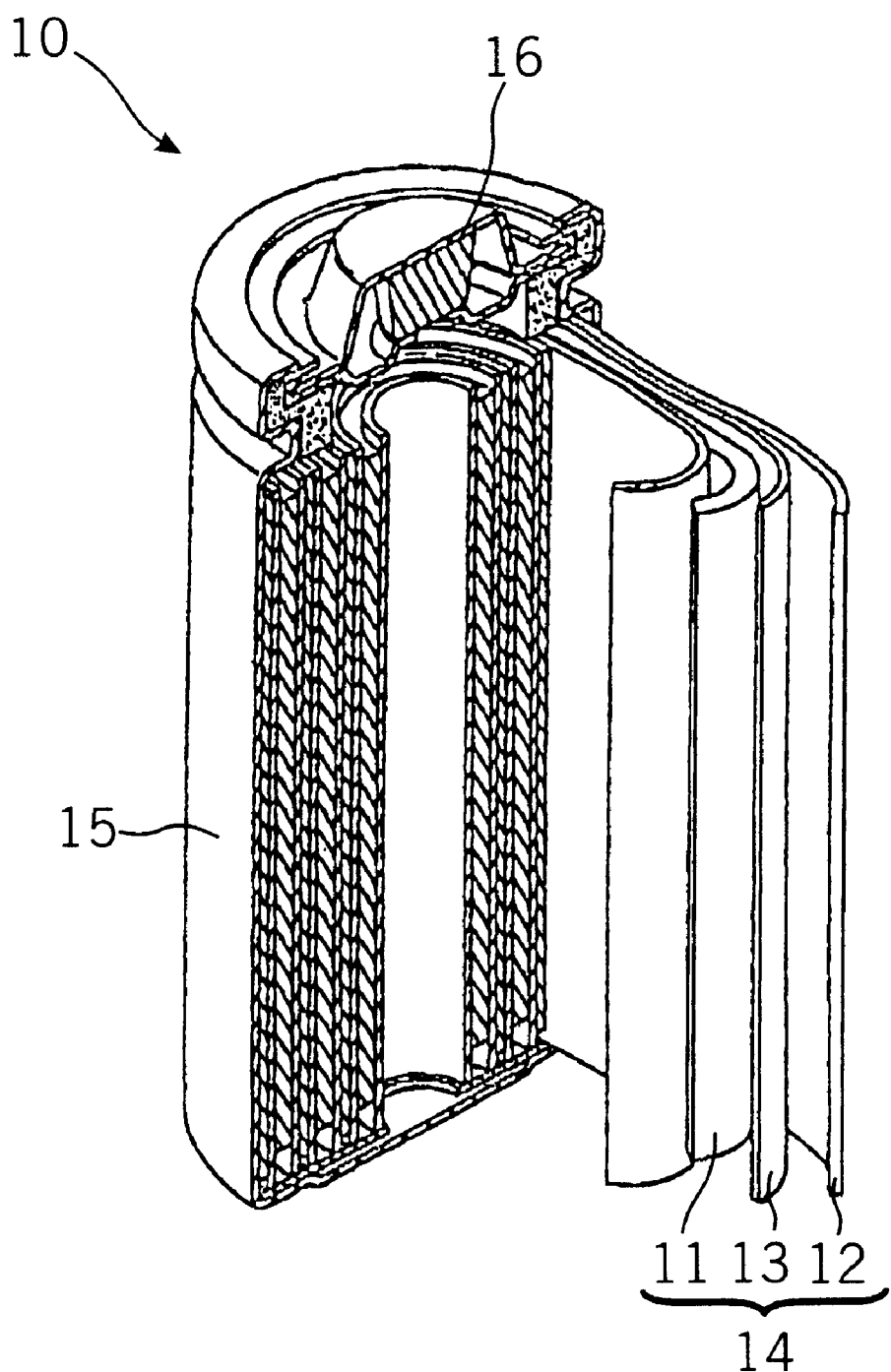
FIG. 1A is a partially exploded view illustrating a conventional lithium ion battery, in which a negative electrode according to the present invention can be incorporated.
Figure 1B:
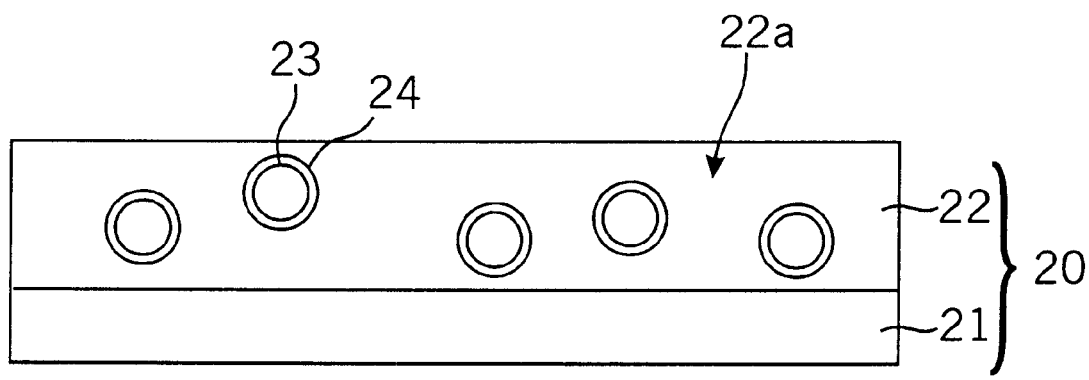
FIG. 1B is a cross sectional view of a negative electrode including an active material coated with a metal oxide according to the present invention.
Figure 1C:
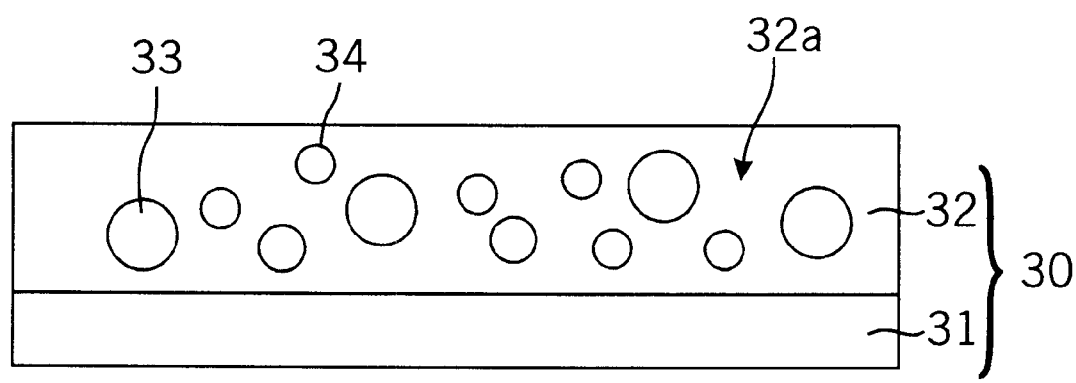
FIG. 1C is a cross sectional view of a negative electrode including a mixture of an active material and a metal oxide according to the present invention.

FIG. 1B is a cross sectional view of a negative electrode 20 according to the present invention including particles of an active material 23 surface-coated with a metal oxide 24 as a metal oxide layer 22, desirably including a binder 22a, that is deposited on a substrate 21 of the negative electrode 20. Also, FIG. 3 is a cross sectional view of a negative electrode 30 according to the present invention including a layer 32 formed of a mixture of a powdered active material 33 and a powdered metal oxide 34, desirably including a binder 32a, deposited on a substrate 31 of the negative electrode 30.

The metal oxide is selected from the group consisting of magnesium oxide (MgO), aluminum oxide ($Al_2O_3$), barium oxide (BaO), and zinc oxide (ZnO).

Preferably, the amount of the metal oxide is within a range of 1–5 wt %. If the amount of the metal oxide is less than 1 wt %, an insufficient electrolyte absorbing efficiency results, and if higher than 5 wt %, the capacity of the negative electrode is reduced because the amount of the negative active material is reduced.

In addition, when using metal oxide powder, the particle size of the powder is less than 5 $\mu$m, preferably less than 1 $\mu$m.

As the negative active material, a well known material such as carbon may be used, but there are not limitations in selecting the negative active material.

A couple of negative electrode examples were made using the above described embodiment of the present invention, then measured in its durability characteristic.

EXAMPLE 1

90 wt % of carbon were impregnated into a magnesium methoxide solution, in which the amount of the magnesium methoxide was regulated such that magnesium oxide contained therein was about 2 wt %. The magnesium methoxide solution impregnated with the carbon was dried, then heat-treated at a temperature of 600° C. for 10 hours so as to obtain a negative active material of the carbon, particles of which are coated with MgO. 8 wt % of polyvinylidene fluoride (PVDF) was mixed with the negative active material as a binder. Next, the resulting mixture was deposited on a copper foil having a thickness of about 20 $\mu$m, then dried, and rollpressed, thereby obtaining a negative electrode having a thickness of about 175 $\mu$m.

92 wt % of $LiCoO_2$, 4 wt % of active carbon, and 4 wt % of PVDF were mixed together, then deposited on an aluminum foil having a thickness of 30 $\mu$m, dried and roll-pressed, thereby obtaining a positive electrode having a thickness of about 160 $\mu$m.

In addition, as a separator, a polyethylene having a thickness of about 25 $\mu$m was used, and 1M of a mixture solution of $LiPF_6$, where ethylene carbonate, dimethoxy carbonate and diethoxy carbonate were mixed at a rate of 3:3:1 was used as an electrolyte.

Using the above described positive and negative electrodes, a 18650-type battery having a standard capacity of 1850 mAH was made under the condition of 0.5C 4.2 V charging and 0.2 C 2.75 V cut-off discharging.

Durability of the above-battery was tested through 300-recharging operations. The battery was recharged for 2.5 hours under the condition of IC 1800 mAH 4.2V, and discharged to 2.75V after 10 minutes from the completion of the recharging operation.

As shown in FIG. 1, the battery retained 85% of its initial capacity after 300-recharge cycles. This shows that the durability of the battery according to the present invention is greatly increased when compared with that of the conventional battery.

COMPARATIVE EXAMPLE 1

A negative electrode was made in the same manner as that of EXAMPLE 1 except that the carbon was not coated with the MgO. A positive electrode. a separator, and an electrolyte were made in the same manner as that of Example 1.

As shown in FIG. 1, the battery made using the method of the comparative example retained 40% of its initial capacity after 300-recharge cycles.

EXAMPLE 2

90 wt % of carbon, 2 wt % of MgO powder having a particle size of 1 $\mu$m, a and 8 wt % of PVDF as a binder were mixed, then deposited on a copper foil having a thickness of about 20 $\mu$m, dried and roll-pressed, thereby obtaining a negative electrode having a thickness of about 175 $\mu$m.

92 wt % of $LiCoO_2$, 4 wt % of active carbon, and 4 wt % of PVDF were mixed, then deposited on an aluminum foil having a thickness of about 30 $\mu$m, dried and roll-pressed, thereby obtaining a positive electrode having a thickness of about 160 $\mu$m.

In addition, a polyethylene film having a thickness of about 25 $\mu$m as used as a separator, and 1M of a mixture solution of $LiPF_6$, where ethylene carbonate, dimethoxy carbonate and diethoxy carbonate were mixed at a rate of 3:3:1 was used as an electrolyte.

Using the above described positive and negative electrodes, the separator, and the electrolyte, a 18650-type battery having a standard capacity of 1850 mAH was made under the condition of 0.5 C 4.2 V charging and 0.2 C 2.75 V cut-off discharging.

Durability of the battery was tested by being recharged 250 times. The battery was recharged for 2.5 hours under the condition of 1C 1800 mAH 4.2 V, and discharged to 0.2C 2.75 V after 10 minutes from the completion of the battery recharge.

Figure 2:
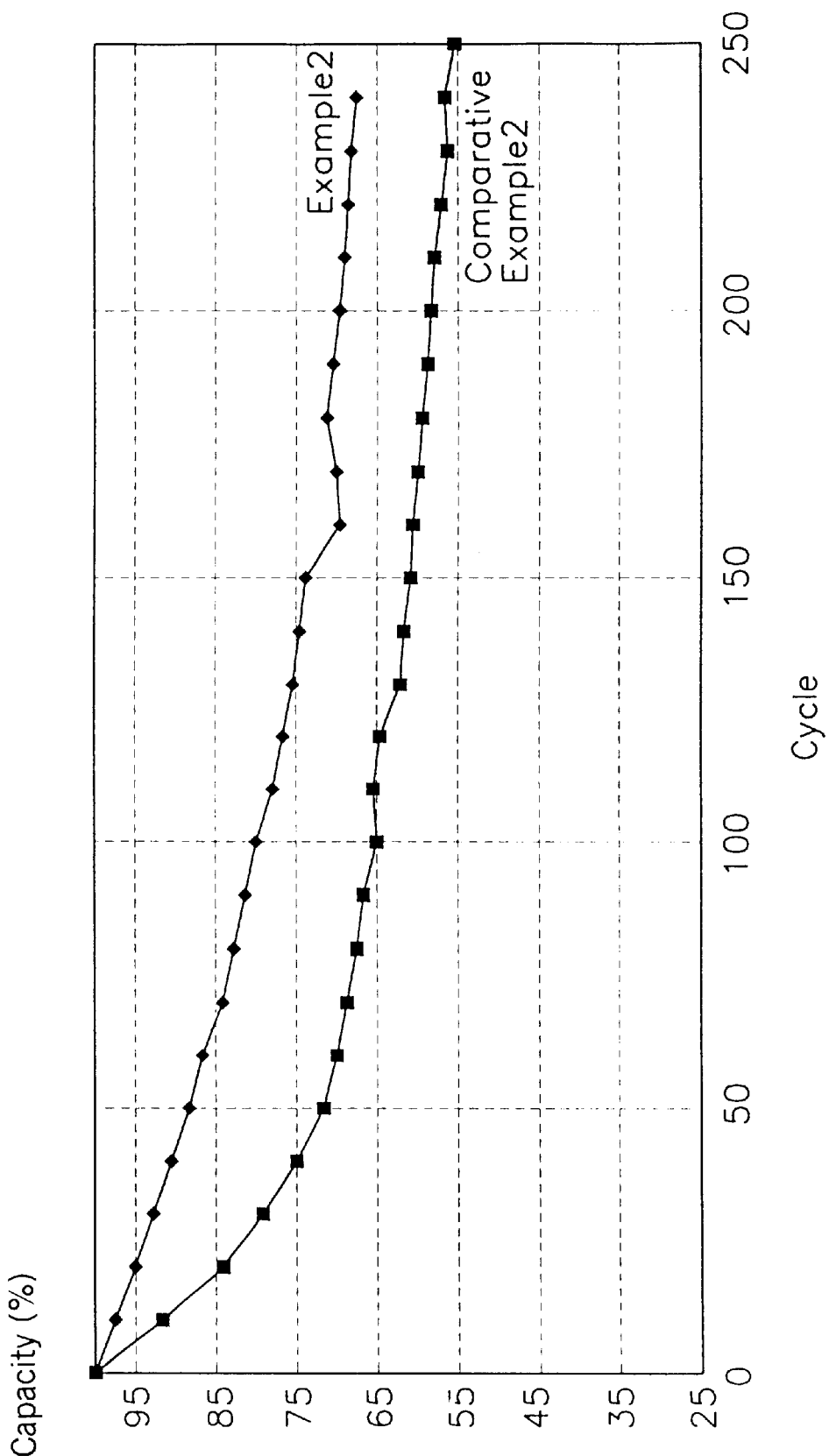
FIG. 2 is a graph illustrating a durability characteristic of a lithium-ion battery made of a metal oxide mixture according to the present invention.

As shown in FIG. 2, the battery retained 68% of its initial capacity after 300-recharge cycles. This shows that the durability of the battery according to the present invention is greatly increased when compared with that of the conventional battery.

COMPARATIVE EXAMPLE 2

A negative electrode was made in the same manner as that of Example 2 except that the carbon was not coated with the MgO. A positive electrode, a separator, and an electrolyte were made in the same manner as that of EXAMPLE 1. As shown in FIG. 2, a battery made using these electrodes retained 55 % of its initial capacity after 300-recharge cycles.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A negative electrode for a lithium secondary battery, comprising:

a substrate; and a layer comprising a negative active material and a metal oxide deposited on the substrate, the negative active material comprising carbon, with a weight percent of the carbon being greater than a weight percent of the metal oxide in the layer of the negative electrode, the metal oxide being selected from the group consisting of magnesium oxide (MgO), aluminum oxide ($Al_2O_3$), barium oxide (BaO) and zinc oxide (ZnO).

2. The negative electrode of claim 1, further comprised of the metal oxide being coated on a surface of particles of the negative active material.

3. The negative electrode of claim 1, further comprised of the metal oxide and the negative active material are each powdered and mixed together, and then deposited on the substrate.

4. The negative electrode of claim 1, further comprised of the layer of the negative electrode further comprising a binder, and an amount of the metal oxide is in a range of 1 to 5 weight percent based on 100 weight percent of a mixture of the negative active material, the metal oxide and the binder.

5. If The negative electrode of claim 1, further comprised of a particle size of the metal oxide being less than 5 $\mu$m.

6. The negative electrode of claim 4, further comprised of the binder including polyvinylidene fluoride.

7. A negative electrode for a lithium secondary battery, comprising:

a substrate; and a layer comprising carbon and magnesium oxide (MgO) deposited on the substrate, with a weight percent of the carbon being greater than a weight percent of the magnesium oxide (MgO) in the layer of the negative electrode.

8. The negative electrode of claim 9, further comprised of the magnesium oxide (MgO) being coated on a surface of particles of the carbon.

9. The negative electrode of claim 7, further comprised of the layer of the negative electrode further comprising a binder, and an amount of the magnesium oxide (MgO) is in a range of 1 to 5 weight percent based on 100 weight percent of a mixture of the carbon, the magnesium oxide (MgO) and the binder.

10. A negative electrode for a lithium secondary battery, comprising:

a substrate; and a layer comprising carbon and aluminum oxide ($Al_2O_3$) deposited on the substrate, with a weight percent of the carbon being greater than a weight percent of the aluminum oxide ($Al_2O_3$) in the layer of the negative electrode.

11. The negative electrode of claim 10, further comprised of the aluminum oxide ($Al_2O_3$) being coated on a surface of particles of the carbon.

12. The negative electrode of claim 10 further comprised of the layer of the negative electrode further comprising a binder, and an amount of the aluminum oxide ($Al_2O_3$) is in a range of 1 to 5 weight percent based on 100 weight percent of a mixture of the carbon, the aluminum oxide ($Al_2O_3$) and the binder.

13. A method of forming a negative electrode for a lithium secondary battery, comprising the steps of:

providing a substrate; and depositing on the substrate a layer comprising a negative active material and a metal oxide, the negative active material comprising carbon, with a weight percent of the carbon being greater than a weight percent of the metal oxide in the layer comprising the negative active material and the metal oxide, the metal oxide being selected from the group consisting of magnesium oxide (MgO), aluminum oxide ($Al_2O_3$), barium oxide (BaO) and zinc oxide (ZnO).

14. The method of claim 13, further comprising the step of:

coating a surface of particles of the negative active material with the metal oxide in forming the layer comprising the negative active material and the metal oxide.

15. The method of claim 13, further comprising the step of:

mixing together a powder of the metal oxide and a powder of the negative active material in forming the layer comprising the negative active material and the metal oxide.

16. The method of claim 13, further comprising the step of: mixing a binder with the negative active material and the metal oxide in forming the layer comprising the negative active material and the metal oxide.

17. The method of claim 16, further comprising the step of: providing an amount of the metal oxide in a range of 1 to 5 weight percent based on 100 weight percent of a mixture of the negative active material, the metal oxide and the binder.

* * * * *